Jan. 15, 1924.
F. K. FISH, JR
1,480,804
PROCESS OF TREATING LUMBER
Original Filed Sept. 30, 1920
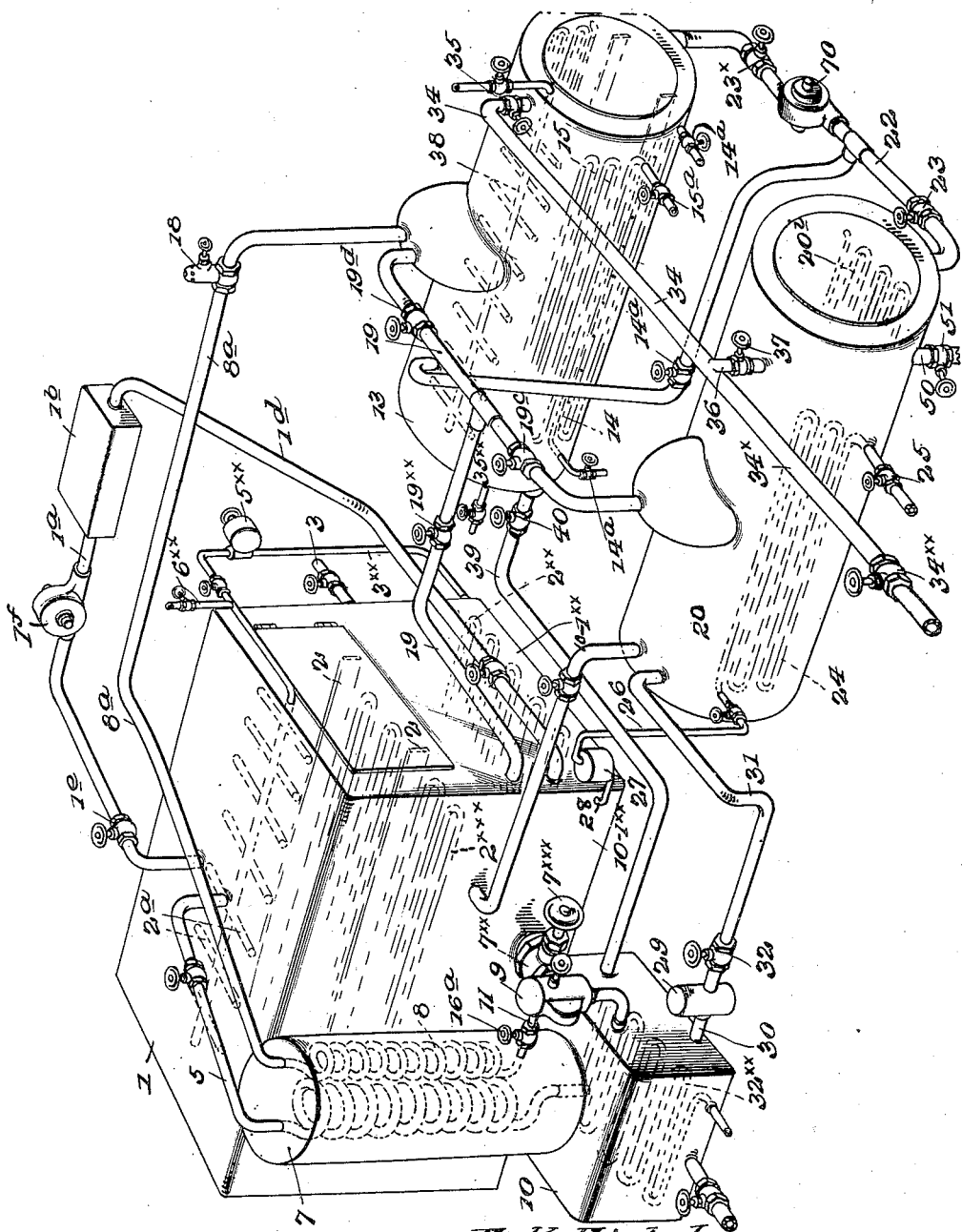
INVENTOR.
F. K. Fish, Jr.
BY
ATTORNEY.

Patented Jan. 15, 1924.

1,480,804

UNITED STATES PATENT OFFICE.

FREDERICK K. FISH, JR., OF RENO, NEVADA, ASSIGNOR, BY MESNE ASSIGNMENTS, TO WOOD PRODUCTS AND BY-PRODUCTS CORPORATION, A CORPORATION OF NEVADA.

PROCESS OF TREATING LUMBER.

Application filed September 30, 1920, Serial No. 413,700. Renewed April 13, 1923. Serial No. 587,028.

*To all whom it may concern:*

Be it known that I, FREDERICK K. FISH, Jr., a citizen of the United States of America, residing at Reno, in the county of Washoe and State of Nevada, have invented certain new and useful Improvements in Processes of Treating Lumber, of which the following is a specification.

The object of this invention is to provide a process for the extraction of true resins, which are insoluble in water, gums, gummy-sap matters, pitch, and coloring matter from wood containing these substances, in order to soften and otherwise improve the quality of the wood from which they are extracted and to provide a method of increasing the utility of large quantities of lumber which has heretofore been classed inferior on account of excess of resins, pitch, etc., contained therein.

It is a well known fact that fatty pine, especially the butts of trees which have been "turpentined", and such like woods, contain an overabundance of resins, or resinous substances, which are not removable by any of the general processes of wood treatment, and one of the objects of my invention is to provide a treatment whereby such excess resins and resinous substances, as well as soluble gum, gummy sap matters, pitch, and like organic substances can be satisfactorily and sufficiently removed so that the lumber is converted from an inferior grade into a valuable and improved commercial product.

The process is also applicable to secure, if desired, such complete and thorough removal of pitch, gums, resins and resinous substances from woods, holding such substances in ordinary amounts, as to convert such woods into a grade similar to that of the best white pine, such as is employed for patterns and the like.

Another object of my invention is to use the volatile and other extractives previously removed from wood, sawdust, and other wood waste, and also those extractives removed from the lumber in the treatment or process which I herein disclose, and to conserve such extractives after such use.

In my Patents Nos. 1,328,507 and 1,328,657 I have disclosed processes in which the lumber is first subjected to treatment in a heated and moist atmosphere to heat, soften, and expand the fibrous structure of the lumber, and to bring it into better condition for a following treatment with heated or superheated water for the removal of gummy sap matters and other organic substances, and for diffusing and spreading thruout the woody cellular and fibrous structure the unremoved resins and other like preservative elements.

In such patents, the preliminary treatment was given in a chamber termed, "a sweat box". While the wood was under treatment in the chamber, moisture accumulated on the surface of the wood in the form of sweat, and therefore such term for convenience is retained herein though the operation and result are different. In the operation of the process as set forth in the above patents, it was found that in the sweat box a very large percentage of the volatile substances in the wood was vaporized and lost. That such substances, mainly bodies of the terpene series comprising turpentines, oils and volatile components of the lumber were largely vaporized in the sweat box while the non-volatile true resins in the after treatment of the wood, were liquefied and caused to spread thruout the fibrous and cellular structure of the wood.

In the present process I make use of the fact that the terpenes, and oils of the wood are effective solvents of the true resins and like substances in the lumber; and also of the discovery that by preventing the escape of and using such volatile extractives in the sweat box, under more or less pressure, the complex resinous substances are maintained in a more soluble form or are rendered more capable of extraction. By preventing the escape of the terpenes, the gums and resinous bodies are brought into a more liquid condition.

To enable the sweat box treatment to be applied properly and also to conserve and retain all volatile extractives obtained from the wood in such treatment, the sweat box, as will be described, is provided with proper appliances for retaining, circulating and reheating the vapors, as well as with heat coils and means for supplying any desired amount of moisture.

After sufficient treatment in the sweat box the lumber being in a heated, softened and expanded condition with its resinous substances, gums and like matters in desired condition, is removed to a closed container where it undergoes treatment with heated or superheated water charged with or holding terpenes and like oils and volatile and other like extractives from wood. This liquid, comprising water admixed with the extractives from wood, mainly the terpenes and oils, when heated or preferably superheated, acts to dissolve and remove true resins, pitch, gums and gummy organic matters from the wood, so that wood carrying even an excess of resins, as well as soluble gums, pitch and like substances, may have such substances effectively removed.

The result of this process is to soften the wood and to toughen its fibre without rendering it hard and brittle.

For the specific disclosure of an apparatus by means of which my process may be carried out, reference is made to the accompanying drawings, in which:

The figure is a diagrammatic view illustrating a plant for treating lumber according to my invention.

1 indicates a chamber, or sweat box provided with a door or doors, an interior track 2, and spray pipe 2ª. This chamber may be supplied with steam, or heated air thru a pipe 3, leading from a suitable source, or heat and vapor may be introduced to the chamber thru a pipe 19, leading from a container hereinafter referred to, and if desired heat may be introduced to the chamber by means of coils 2ˣˣˣ.

Communicating with the top of the chamber 1, is a pipe 1ª which leads into an air tight hot box 1ᵇ suitably heated by coils. Communicating with the opposite end of the hot box is a pipe 1ᵈ, which leads into the chamber, a valve or valves 1ᵉ being provided to control the pipes. In the pipe 1ª, is a fan 1ᶠ, to draw the vapors from the top of the chamber, and pass them thru the hot box and thru the pipe 1ᵈ, and into the chamber preferably below the track. The fan creates a suction thru the sweet box, and quickly draws off the vapors, and the latter are reheated in the hot box to a degree above the boiling point of the admixture, but the temperature should not be such as to polymerize the terpenes or destroy the lumber. The vapors thus reheated are employed to act on the wood to assist in melting, dissolving and removing a portion of the water soluble and water insoluble constituents from the wood. The vapors are of course charged with the terpenes and terpene alcohols, etc., which when superheated, act to further the extraction of like constituents and a portion of the resinous substances in the lumber.

The chamber extends below the surface of the ground to form a tank 10—1ˣˣ containing liquid initially charged with terpenes, and other volatile components of wood, which may have been extracted from lumber, wood, sawdust or other waste material from the saw mill, and in the bottom of the tank are coils 2ˣˣ to heat the liquid. Communicating with the tank below the water level is a pipe 3ˣˣ, extending into the top of the chamber, and connected to the sprays 2ª to spray the liquid onto the wood. In the pipe 3ˣˣ is a pump 5ˣˣ to force the liquid from the tank 10—1ˣˣ to the spray pipe 2ª. If desired, a branch pipe 6ˣˣ may join the pipe 3ˣˣ, and by means of suitable valves, cold water may be sprayed on the wood at intervals to set the resin surrounding dead knots and thus prevent such knots from falling out.

From the top or dome of the chamber extends a pipe 5, connected with coil 6 of a condenser 7, the coil extending into a collector tank 10.

A vacuum pump 9 connects at its suction end thru pipe 11 to a second coil 8 of condenser 7, discharging into collector tank 10. Coil 8 is connected at its upper end to a pipe 8ª which leads to a container 13. The condenser 7 is arranged to be supplied with any suitable cooling agent, as water or brine, which is circulated from a bottom inlet to an upper outlet, in the usual construction.

The collector tank 10 and the liquid tank 1ˣˣ are practically one, and communicate with each other, as by means of a pipe 7ˣˣ, having a valve 7ˣˣˣ.

Located adjacent to the chamber 1, is a container 13, arranged to receive the truck carrying wood, and in the container there is a track preferably in line with the track 2, in the chamber 1, and between the container and the chamber 1, there will be a track for conveniently transferring a car carrying a load of wood from the sweat chamber 1. This container is provided with a perforated coil 14, provided with a valve 14ª, to supply steam to the interior of the container, and also steam heating coils 15, having valve 15ª. The pipe 8ª connects with the top of the container, and in it is a safety-valve 18, which also may act as an ordinary controlling valve. The pipe 19, leading from the sweat-chamber 1, is connected to a pipe 19ª, the ends of which are connected to the top of a tank 20, and the container 13, the pipe 19ª having controlling valves 19ᶜ and 19ᵈ for a purpose to be explained.

In the tank 20, are heating coils 24, having a valve 25, and condensation pipe 26, connected with a steam trap 27, which preferably discharges thru pipe 28, into tank 10—1××.

The suction end of a force-pump 29, is connected with the collection tank 10, by pipe 30, and the discharge end of said pump is connected to the tank 20, by a pipe 31, having a valve 32.

A pipe 34, provided with a valve 35, communicates with container 13, and with tank 20, by a branch pipe 36, provided with a valve 37. Spray pipes 38, connected with a supply of cold water are installed at the top of container 13, and a pipe 39 provided with a valve 40, connects the container 13 with the collector-tank 10. A branch pipe 34×, connects with the pipe 34, and by means of valves 34×× live steam may be introduced into the top of tank 20, or the top of the container 13.

The foregoing description of the conventionally illustrated apparatus is simply for the purpose of outlining a plant for carrying out the process, and I will now describe in detail the various steps and the functions accomplished thereby.

Liquid initially charged with terpenes, oils, and other like extractives of wood substances is introduced into tank 20, thru pipe 50 by opening valve 51, and if the plant has been previously used, the contents of tank 10—1××, are pumped into tank 20, and thru the medium of heating coils 32××, the liquid is superheated, or in other words the temperature of the liquid is raised above its boiling point, and the pressure is allowed to rise above atmospheric, to prepare it for quickly acting on the lumber later on when introduced into container 13.

A truck load of lumber is run into the chamber 1, and steam, heated air, or any combination of them are introduced thru the pipe 3, this heat is above the boiling point of the liquid in tank 10—1××, so that it volatilizes and its vapors fill the chamber 1. After the first truck load has passed thru the chamber, and is under treatment in container 13, the vapor from the container 13, may be utilized also, this vapor being heavily charged with the terpenes removed from the wood while being treated in the container. Valves in the pipes 19 and 19ª are regulated to allow the passage of steam as desired from either or both the container 13 and tank 20, into the chamber 1 and if necessary, the heat in the said chamber may be augmented by heat from the steam coils 2××.

It is desirable that the temperature of the wood in the chamber 1 be raised above the boiling point of the admixed terpenes and water, and that the treatment of the wood during this step of the process be for one or two hours, depending upon the thickness and character of the wood or material being treated. The vapors are circulated by the fan 1ᶠ thru hot box 1ᵇ where they are reheated to assist in raising the temperature in chamber 1 to a desired degree, but not high enough to polymerize the terpenes in the wood or to have a harmful effect upon the wood.

The steam, hot liquid produced by the spray, and terpenes or the like vapors in the chamber 1, when reheated and applied to the lumber, penetrate and soften its entire structure, as well as the soluble gums and resins of the wood, the combination of steam, oils, and other volatile substances at this temperature, dissolving in the cells of the wood, even to the interior of the separate pieces, certain substances which are normally insoluble in water only, thus preparing the wood for a more ready and effective treatment in the container 13. The high heat reached in the chamber 1 causes the constituents which have been softened but not as yet volatilized, to move to a certain extent, to the surface of the wood. This surfacewise movement may be increased by the occasional application to the surface of the wood of cold water thru spray pipe 2ª, the sudden cooling of the surface of the wood causes a partial condensation of the vapors which results in a movement surfacewise of the interior vapors and oils contained therein, as well as of other constituents. The cold water also, by reason of the lowering of the temperature of the pitch around dead knots, prevents the pitch from "running" prior to the swelling of the knots and of the fibres surrounding them, thus preventing the knots from falling out.

Liquid from the tank 10—1×× is pumped periodically to the spray pipes, to raise the temperature of the wood, and assist in extracting the softened constituents of the wood from its surface and also causes the surface of the wood to swell, which is most advantageous when knotty material is under treatment. The swelling of the knots and the wood surrounding the knots, effecting a binding action between the two, which substantially prevents the knots from falling out. This action also happens in the superheated liquid treatment later on.

The chamber 1, being tightly closed, some slight pressure will be created therein and to limit this pressure to the desired amount, excess vapors pass thru pipe 5, and are condensed in the coil 6, and thereupon pass into tank 10—1×× and may thereafter be pumped into the tank 20, to be used with the liquid in subsequent treatment of the wood, or sprayed onto the wood thru spray pipes 2ª.

The condensate accumulated in the tank

10—1ˣˣ will be pumped from time to time into tank 20 to add to the strength of the solvent liquid therein, and when the liquid in the tank 20 becomes by reuse, stronger than is necessary, it is either diluted or it is drawn off and separated. If desired the tank 10—1ˣˣ may be of such size as will contain liquid sufficient to recharge tank 20, after all of the concentrated liquid has been drawn off.

The vapors rising from the wood in the chamber 1 are reheated and in their reheated state are directed upon the lumber causing a dissolving and partial distillation of the resins in the wood under treatment, care being taken to regulate the temperature so that there will be no polymerization of the terpenes. Therefore, the valve $1^e$ is opened and the fan $1^f$ sucks the liberated vapors from the top of the chamber and introduces same into the sealed hot box, where they become reheated, and are subsequently directed thru the pipe $1^d$, and into the chamber 1. The result of this action is to create a circulation thru the chamber, which causes the vapors charged with terpenes, oils, and other volatile substances introduced thru pipe $1^d$ to cooperate with the steam and the vapors liberated from the wood, to co-mingle or mix and act promptly to dissolve and liberate other similar constituents in the wood. In other words the charged vapor is by this action employed as a solvent to act on the otherwise insoluble or slightly soluble constituents in the wood. While this action is going on a portion of the excess vapors are escaping thru the pipe 5, and are condensed in tank 10, for reuse in the process.

While bringing up the temperature of the wood by the introduced heat and vapors, the hot spray pumped from the tank 10—1ˣˣ is introduced upon the wood, and afterwards comes into contact with the heating coils, a portion of the spray being vaporized and it then rises and reacts together with the vapor otherwise liberated from the wood and that introduced to the chamber, to dissolve and remove a portion of the water soluble and water insoluble constituents of the wood.

As this step is continued, terpenes, oils, and other like substances are liberated from the wood in the form of vapor and together with the condensate produced from the introduced vapors, as well as from a portion of the liquid, spray, dilute and partially remove water insoluble constituents of the wood which are collected in the tank below for reuse in the process.

After the wood has been treated in the chamber 1, for a sufficient time to raise the temperature to the required degree and to soften the lumber and to dissolve and remove a portion of the different constituents, the supply thru pipes 3 and $1^d$ is cut off, or if the vapors from the container 13 are utilized, valve $19^c$ or $19^d$ or both, are closed, and the load of wood is transferred to the container 13, and a new load is run into the chamber 1.

When the load of wood is removed from the chamber, and is exposed to the air, while in transit to the container, the differences between the internal temperature of the wood and that of the exterior, causes vaporization of the moisture within the wood and an interior movement surfacewise, this action preparing the wood for quicker treatment in the next step in the container 13.

The wood having been introduced into the container, the latter is sealed, and valves $16^a$ and 18 are opened, and the vacuum pump 9 is started to create a vacuum of approximately 15 inches in the container. To attain the vacuum quickly cold water is forced thru spray pipe 38 and upon the wood. The vacuum further removes terpenes and vapors from the wood, and these in passing thru coil 8, condense and are discharged into the collector tank 10, for reuse in the process. The vacuum in the container lowers the pressure within the wood below atmospheric, causing a cellular expansion, which with the removal of the vapors from the wood tends to allow a more ready penetration of the liquid employed in the next step in the process. This vacuum also removes air from the retort preventing discoloration of the resins.

The condensate from tank 10 is pumped into the tank 20, and mixes with the liquid therein, and the condensed terpenes and vapors become mixed with the superheated liquid and add to its solvent power. The valve 23 is opened and the superheated liquid passes from the tank 20, to the container 13. The liquid in the tank 20 is initially charged with terpenes, oils and other like extractives from wood substances to act on the constituents of the wood in the treatment of the latter. The movement of the liquid from the tank 20 to the container is assisted by introducing steam or other gaseous medium thru pipe 34, upon the top of the body of liquid in tank 20.

As the superheated liquid, containing terpenes, oils and like extractives from wood, is introduced into the container, to prevent excess pressure within the container and allow the liquid to flow freely into said container, valve $19^d$ may be opened and the vapors pass thru pipe 19 into the chamber 1, the charged vapors being employed to assist in the first treatment of the wood. The liquid may also be moved into the container by means of the pump 70. Afttter the liquid is turned into the container, and the wood becomes submerged, valve $19^d$ is closed, and steam is turned into the heating coils 15, to maintain the liquid at a temperature above its normal boiling point, which creates a pressure in the container, or in other words, the liquid is maintained in a superheated condition. Steam may also be admitted thru perforated pipe 14.

It is desirable to superheat the liquid and a temperature of or about 245° F., and a corresponding pressure of about twelve pounds above atmospheric is preferably maintained.

The wood is subjected to the liquid treatment for a period of approximately one or two hours, depending entirely upon the nature and thickness of the wood. The superheated liquid, being at high temperature and pressure, and being charged with terpenes, oils and like extractives from wood, quickly dissolves and extracts liquid soluble gums and similar soluble constituents, and also quickly extracts oils, and terpenes, and like extractives from wood and introduces them to the liquid surrounding the wood and further melts and spreads and partially removes the true resins which are insoluble in water and acts upon the same. As these terpenes, oils, and resins are extracted, they add to the solvent power of the liquid, and extract materials from the wood, which would be insoluble in water only.

The time of treatment under this step of the process, depends upon the character and thickness of the wood being treated, and for that reason the treatment may be shortened, or it may be prolonged and intensified for such time and to such a degree as may be found desirable. The temperature is also limited to a degree which will not form pyroligneous acid or polymerize the terpenes.

The superheated liquid permeates thruout the entire structure of the wood, and the materials acted upon by it are dislodged from their original position in the wood, and those which are soluble in the liquid are dissolved and due to the surrounding pressure and the agitation and ebullition of the liquid surrounding the wood, the materials which have been removed become intermingled or mixed in the entire body of the liquid. To maintain a uniform composition of the liquid, an active circulation and agitation of the liquid is secured by a pump 70 drawing from the bottom of retort 13, and discharging into the upper opposite end thereof. The liquid thus becomes further charged with solvent extractives, the nature of which is largely dependent upon the character of wood being treated. It has been found, however, that in practicing the process, the liquid used in the treatment contains terpenes, resins, oil and ligneous matter and the like. Furthermore, as long as the high heat is maintained, and the fact that the liquid is confined and agitated, the substances are so thoroughly intermixed in the liquid, as to make it impossible to independently distinguish them.

While the treatment is in progress, the liberated extractives also become intermingled in the liquid, and this liquid, charged and mixed with these substances penetrates the wood and dissolves a portion of certain resinous substances, which are not of themselves soluble even in superheated water.

When the wood under treatment has been thus effectively acted upon by the superheated liquid, mixed with contained extractives from wood, the valves 18 and $19^{d}$ and $19^{xx}$ and $35^{xx}$ are opened, and the vacuum pump is started to quickly bring the pressure in container 13 to or about atmospheric. At this time the spray of water thru the spray pipes 38, upon the surface of the liquid acts to quickly condense a portion of the vapors, and to reduce the pressure above the water. The pipes 19 and $19^{a}$ are opened and assist in reducing the pressure within the container. A portion of the vapor in the container 13, passes thru said pipes 19 and $19^{a}$ to the tank 20, and to the chamber 1. This sudden release of pressure surrounding the wood causes liquid in the wood to change into vapor, thereby forcing both soluble and insoluble materials in the interior of the wood towards its surface and into the liquid and also causes an expansion of the wood and the individual fibers of the wood. This is a very important step in the process. When the pressure within the container reaches atmospheric or lowered to any desired degree, the temperature and pressure of the liquid surrounding the lumber may again be raised. These sudden changes in pressure and temperature may be resorted to as many times as may be deemed advisable.

After the lumber has been heated in superheated liquid as above one or more times, additional liquid from tank 20 is forced over to fill the container 13 by the pump 70, and by continued operation of the pump, pressure of about 15 lbs., is again created in said container while the lumber is still submerged, but the liquid at this time is not superheated. This pressure is suddenly released by passing some of the liquid back to tank 20, this action effects a sudden lowering of the pressure surrounding the lumber and causes an outflow of the liquid from the interior of the lumber. The valve 23 is again opened and the pump 70 forces the liquid from the container to tank 20 for reuse.

Following this step, valve 18 is opened and the vacuum pump 9 is started, and a vacuum is again created in the container 13 to remove from the lumber liquid which has been forced into it, and simultaneously cold water is sprayed onto the wood thru the spray pipes 38, to condense quickly the vapors and assist in creating a vacuum quickly. The wood may now be removed from the container, and a second charge being treated in chamber 1, may be moved into the container.

The liquid treatment may be repeated and alternated with a vacuum, to insure of the extraction of the elements from the wood, as it has been found that the wood structure when first opened up by the action of the liquid and then acted on by a vacuum, will further give off some of its constituent elements.

Care is taken to arrest the treatment before any disintegration of the wood begins so that the elasticity and strength of the wood will not be impaired. The term "vacuum" is used to mean a reduction of pressure to such a degree below the higher pressure as to cause a substantial expansion of residual air or vapor in the interior of the wood which effects an opening up of the interior fibrous structure.

After the wood has been treated in the container as described, it is transferred to a kiln to be dried. Between the container and the kiln the hot wood is again exposed to the lower temperature of the atmosphere which causes further condensation and vaporization of the removable constituents of the wood. In the kiln are steam coils 50 and a fan or the like 51, will be provided to periodically withdraw the moisture from around the wood.

While the wood is drying in the kiln, it is sprayed periodically with water to prevent shrinking of the surface of the wood, which retains the pores in an open condition and allows the interior moisture to evaporate more quickly than is possible with ordinary methods. This step also insures against checking of the wood while the moisture is evaporating.

What I claim is:—

1. The process of treating lumber comprising subjecting the lumber to heated moist atmosphere containing added volatile extractives from lumber.

2. The process of treating lumber comprising subjecting the lumber to heated moist atmosphere containing added volatile extractives from lumber, and spraying the wood with liquid charged with extractives from lumber to open up the structure.

3. The process of treating lumber comprising subjecting the lumber to heated moist atmosphere containing vaporized volatile solvent extractives given off by the lumber, and perdiodically spraying the wood with liquid to open up the surface structure to assist in further liberating the vaporized volatile solvent extractives.

4. The process of treating lumber comprising subjecting the lumber while in a sealed chamber to the action of heated vapors charged with the oils, terpenes of lumber, to act on and melt and remove a portion of the volatile extractive constituents of the lumber.

5. The process of treating lumber comprising subjecting the lumber while in a sealed chamber to the action of heated vapors charged with the oils, terpenes of lumber, to melt and dissolve in the lumber a portion of the water insoluble constituents of the lumber, and thereafter to the action of sprays of liquid to cause the resins to set upon the surface of the lumber.

6. The process of treating lumber comprising subjecting the lumber to heated moist atmosphere to liberate vapors charged with a portion of the soluble and insoluble constituents and spraying the lumber with liquid charged with soluble and insoluble constituents of lumber and collecting the liquid and thru circulation reusing same on the lumber to melt, dissolve and remove a portion of the soluble and insoluble constituents of the lumber.

7. The process of treating lumber comprising subjecting the lumber to heated moist atmosphere to liberate vapors charged with a portion of the soluble and insoluble constituents, collecting the charged vapors and condensing same and subsequently spraying the lumber with liquid charged with the condensate to melt and dissolve a portion of the water soluble and water insoluble constituents of the lumber.

8. The process of treating lumber comprising subjecting the lumber to heated moist atmosphere charged with soluble constituents of lumber and periodically spraying the lumber with liquid charged with water soluble constituents of lumber, collecting and heating the vapors and subsequently introducing same to the lumber, collecting the charged vapors and condensing and mixing same with the liquid employed for spraying the lumber.

9. The process of treating lumber comprising subjecting the lumber while over a body of liquid charged with the constituents of lumber to a heated moist atmosphere to liberate the water soluble constituents of the lumber, and periodically spraying the lumber with the liquid below the lumber to augment the liberation of the moisture.

10. The process of treating lumber comprising subjecting the lumber to a heated moist atmosphere charged with the volatile solvent extractives of lumber to melt, dissolve and remove a portion of the soluble and insoluble constituents, transferring the lumber to a container, and submerging same in superheated liquid charged with volatile solvent extractives of lumber.

11. The process of treating lumber comprising subjecting the lumber to superheated vapor charged with volatile solvent extractives of lumber to liberate a portion of the soluble and insoluble constituents of the lumber under treatment, transferring the lumber to a container and submerging same in superheated liquid charged with volatile solvent extractives of lumber to remove soluble constituents and melt the insoluble constituents, and thereafter drying the lumber.

12. The process of treating lumber comprising subjecting the lumber to reheated vapor previously used to treat lumber and charged with volatile solvent extractives, transferring the lumber to a container and submerging the lumber in liquid charged with volatile solvent extractives to further dissolve and remove soluble and insoluble constituents of the lumber, removing the liquid from around the lumber, and thereafter drying the lumber.

13. The process of treating lumber comprising submerging lumber in superheated liquid charged with volatile solvent extractives of wood to melt, dissolve and remove a portion of soluble and insoluble constituents, removing the liquid from around the lumber, and thereafter drying the lumber.

14. The process of treating lumber comprising removing a portion of the soluble and insoluble constituents from the lumber, thereafter removing the lumber to a heated atmosphere and periodically spraying the lumber with water to prevent the lumber contracting on its surface and the closing of the pores of the lumber while drying.

15. The process of treating lumber comprising subjecting the lumber to vapors charged with volatile solvent extractives of the lumber being treated, periodically circulating a liquid charged with volatile solvent extractives and spraying said liquid on the lumber, reheating the vapors produced therefrom and re-introducing said vapors to the lumber to melt, dissolve and remove a portion of the soluble and insoluble constituents.

16. The process of treating lumber comprising subjecting the lumber to vapors charged with volatile solvent extractives to melt, dissolve and remove a portion of the soluble and insoluble constituents of the lumber, thereafter submerging the lumber in superheated liquid charged with volatile solvent extractives of wood to further melt, dissolve, and remove a portion of the soluble and insoluble constituents of the lumber, removing the liquid from around the lumber, transferring the lumber to a drying kiln having a drying temperature, and while drying, spraying the lumber with water to prevent the surface expanding and closing the pores.

17. The process of treating lumber comprising submerging the lumber in heated liquid initially charged with volatile solvent extractives of wood to dissolve and remove a portion of the soluble and insoluble constituents, and while submerged alternately increasing the pressure above atmospheric and decreasing the pressure below atmospheric, removing the liquid, and thereafter drying the lumber.

18. The process of treating lumber comprising subjecting the lumber to heated moist atmosphere charged with the volatile solvent extractives from the wood being treated, collecting the charged vapors and condensing same to be subsequently vaporized to act on the lumber, transferring the lumber to a container and submerging the lumber in superheated liquid initially charged with volatile solvent extractives from wood to melt, dissolve and remove a portion of the soluble and insoluble constituents, relieving the pressure from the container and collecting the vapor from the liquid and condensing same for enriching the liquid in which lumber is to be treated, thereafter removing the liquid, and subsequently drying the lumber.

19. The process of treating lumber comprising subjecting the lumber to superheated vapor previously used to treat lumber and charged with the volatile solvent extractives of lumber together with a supply of heated air, thereafter submerging the lumber in superheated liquid charged with the volatile solvent extractive of lumber to cause a portion of the soluble and insoluble constituents to move surfacewise, removing the liquid and subsequently drying the lumber.

20. The process of treating lumber comprising subjecting the lumber to superheated vapor previously used to treat lumber and charged with the volatile solvent extractives of lumber together with a supply of heated air, thereafter submerging the lumber in superheated liquid charged with the volatile solvent extractives of lumber to cause a portion of the soluble and insoluble constituents to move surfacewise, removing the liquid, transferring the lumber to a heated kiln and while drying introducing a spray of water to the lumber to prevent the surface shrinking and closing the pores.

21. The process of treating lumber comprising subjecting the lumber to a circulated vapor initially charged with the volatile solvent extractives of lumber to vaporize the volatile constituents of the lumber being treated, which vapors enrich the circulating vapors to assist in melting, dissolving and removing like constituents from the lumber.

22. The process of treating lumber comprising subjecting the lumber to a circulated vapor initially charged with the volatile solvent extractives of lumber to vaporize the volatile constituents of the lumber being treated, which vapors enrich the circulating vapors to assist in melting, dissolving and removing like constituents from the lumber, thereafter drying the lumber in a heated kiln and while drying spraying the surface of the lumber with water to prevent shrinkage and closing of the pores of the lumber.

23. The process of treating lumber comprising subjecting the lumber to vapors charged with volatile solvent extractives of lumber and simultaneously introducing reheated vapor to the charged vapors, spraying the lumber with liquid charged with the volatile solvent extractives of wood to cause like substances in the interior of the lumber to move surfacewise.

24. The process of treating lumber comprising subjecting the lumber to vapors charged with volatile solvent extractives of lumber and simultaneously introducing reheated vapor to the charged vapors, spraying the lumber with liquid charged with the extractives of lumber to cause like substances in the interior of the lumber to move surfacewise, and periodically spraying the lumber with water.

25. The process of treating lumber comprising subjecting the lumber to heat over a body of liquid charged with the volatile solvent extractives of lumber and in a vaporized atmosphere charged with the extractives of lumber to melt, dissolve and remove a portion of the volatile solvent extractives from the lumber.

26. The process of treating lumber comprising subjecting the lumber to heat over a body of liquid charged with the volatile solvent extractives of lumber and in a vaporized atmosphere charged with like extractives of lumber, and causing a circulation of such vapor repeated about the lumber to melt, dissolve and remove a portion of the volatile solvent extractives from the lumber.

27. The process of treating lumber comprising subjecting the lumber over a body of liquid charged with the volatile solvent extractives of lumber and in a vaporized atmosphere charged with like extractives of lumber, introducing reheated vapor to the lumber, and periodically introducing heated air to the lumber and periodically spraying the lumber with liquid charged with volatile solvent extractives of lumber to melt, dissolve and remove a portion of like constituents from the lumber.

28. The process of treating lumber comprising subjecting the lumber to vapor charged with volatile extractives of wood, creating a vacuum about the lumber and simultaneously spraying with water to cause a surfacewise movement of moisture and extractives, submerging the lumber in heated liquid charged with wood extractives removing the liquid and drying.

29. The process of treating lumber comprising subjecting the lumber to heated moist atmosphere containing vaporized volatile solvent extractives given off by lumber, and spraying the lumber with liquid to open up the surface structure to assist in further liberating the vaporized volatile solvent extractives.

30. The process of treating wood comprising subjecting the lumber to heated moist atmosphere containing vaporized volatile solvent extractives given off by the lumber, and spraying the lumber with liquid charged with soluble and insoluble constituents from lumber to open up the surface structure, to assist in further liberating the vaporized volatile solvent extractives.

31. The process of treating lumber containing moisture, comprising submerging the lumber in heated liquid containing soluble gums, terpenes and other extractives of wood, and while submerged suddenly reduce the pressure surrounding the lumber to expel liquid content from the lumber and expand the lumber and the fibers thereof.

32. The process of treating lumber, comprising subjecting the lumber to steam, and expanding the lumber by suddenly condensing the steam surrounding the lumber by spraying the lumber with a spray of liquid.

33. The process of treating lumber comprising subjecting the lumber to steam under pressure and suddenly reducing the pressure of the surrounding atmosphere to or below atmospheric to condense the moisture in the lumber and expand the same.

34. The process of treating lumber which comprises subjecting the lumber to heated liquid initially charged with volatile solvent extractives of wood.

35. The process of treating lumber which comprises subjecting the lumber to heated liquid initially charged with volatile solvent extractives of wood, arresting the treatment upon the removal of substantially all resins and without deterioration of the woody structure to provide a wood suitable for pattern work.

36. The process of treating lumber comprising submerging the lumber in heated liquid initially charged with volatile solvent extractives of wood, and while submerged raising and lowering the pressure, causing more effective penetration of the liquid to remove the soluble extractives.

37. The process of treating lumber comprising subjecting the lumber to heated moist atmosphere initially charged with soluble constituents of lumber, submerging the lumber in superheated liquid initially charged with extractives of lumber and while submerged agitating the liquid to dissolve and remove soluble constituents of the lumber, removing the liquid from around the lumber, and thereafter drying the lumber.

38. The process of treating lumber comprising subjecting the lumber to heated moist atmosphere initially charged with soluble constituents of lumber, submerging the lumber in superheated liquid initially charged with extractives of lumber and while submerged creating a current of the superheated liquid to dissolve and remove soluble constituents of the lumber, removing the liquid from around the lumber and thereafter drying the lumber.

In testimony whereof I affix my signature.

FREDERICK K. FISH, Jr.